(12) United States Patent
Yoshida

(10) Patent No.: US 7,859,559 B2
(45) Date of Patent: Dec. 28, 2010

(54) OPTICAL SCANNING APPARATUS AND OPTICAL SCANNING METHOD

(75) Inventor: Hidefumi Yoshida, Abiko (JP)

(73) Assignee: Canon Kabushiki Kaisha (JP)

( * ) Notice: Subject to any disclaimer, the term of this patent is extended or adjusted under 35 U.S.C. 154(b) by 74 days.

(21) Appl. No.: 11/953,921

(22) Filed: Dec. 11, 2007

(65) Prior Publication Data
US 2008/0144122 A1 Jun. 19, 2008

(30) Foreign Application Priority Data
Dec. 14, 2006 (JP) ............................. 2006-336947

(51) Int. Cl.
*B41J 2/435* (2006.01)
*B41J 2/47* (2006.01)

(52) U.S. Cl. .................. 347/247; 347/237; 358/300

(58) Field of Classification Search .................. 358/1.9, 358/409, 471; 347/237, 43, 247
See application file for complete search history.

(56) References Cited

U.S. PATENT DOCUMENTS 5,202,774 A * 4/1993 Ishimitsu .................... 358/488
5,359,651 A * 10/1994 Draganoff .................... 379/354

FOREIGN PATENT DOCUMENTS

| JP | 11-216906 A | 8/1999 |
| JP | 2000-253215 A | 9/2000 |
| JP | 2003-344790 A | 12/2003 |
| JP | 2005-096351 A | 4/2005 |

* cited by examiner

*Primary Examiner*—Benny Q Tieu
*Assistant Examiner*—Eric A Rust
(74) *Attorney, Agent, or Firm*—Rossi Kimms & McDowell LLP

(57) ABSTRACT

A memory read control unit (606) reads out image data of one pixel from a memory (603) in synchronism with a clock signal. On the basis of the image data of one pixel, a converting unit (604) converts the density of a corresponding pixel into digital data of a plurality of bits and stores the digital data in a shift register (606). A pixel-piece insertion and deletion control unit (607) inserts data of one bit into the shift register or deletes data of one bit from the shift register. The pixel-piece insertion and deletion control unit (607) estimates a data storing state in the shift register and controls image data read-out from the memory (603) in accordance with the estimated data storing state.

4 Claims, 11 Drawing Sheets

FIG. 1
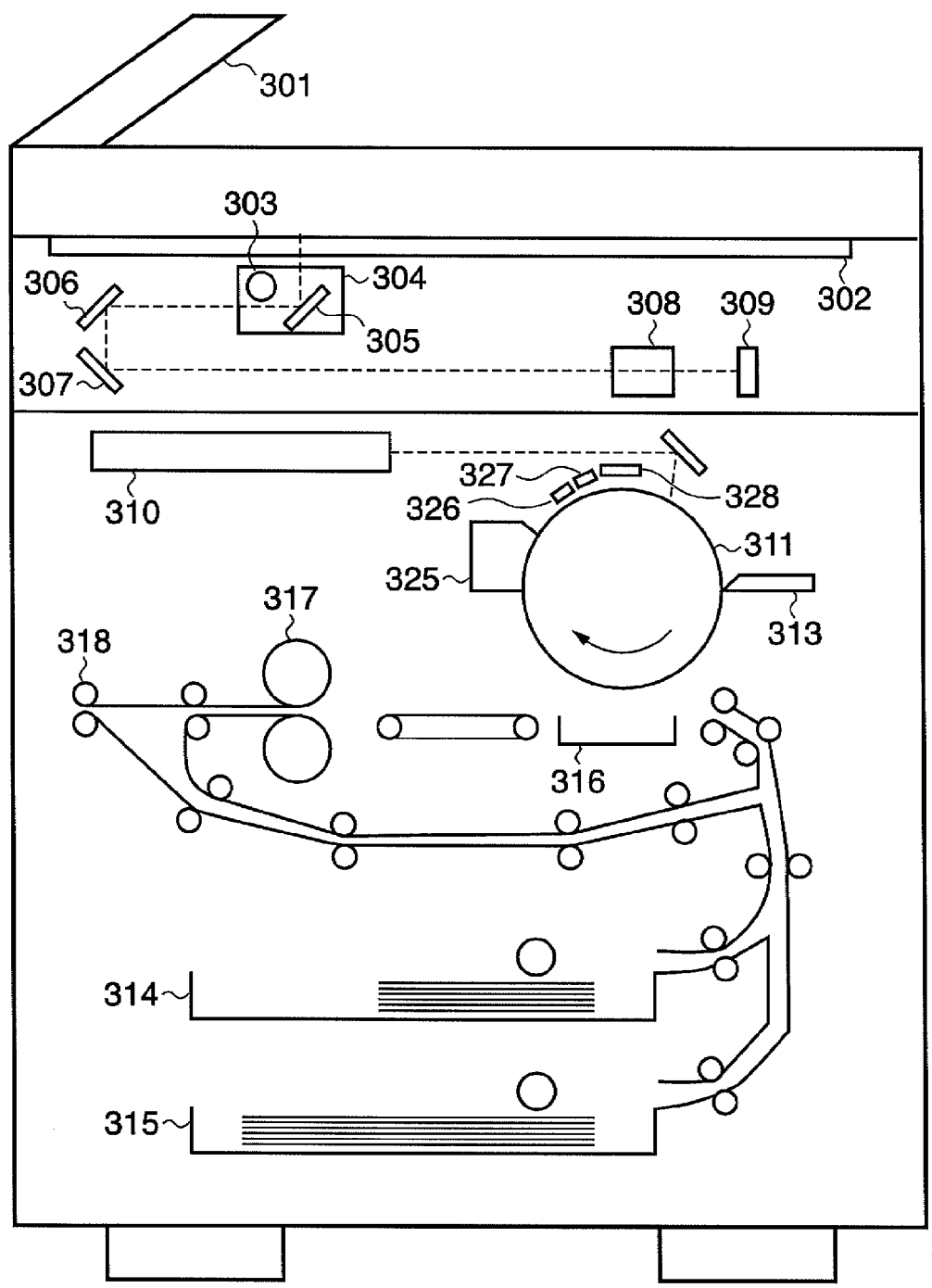

FIG. 2
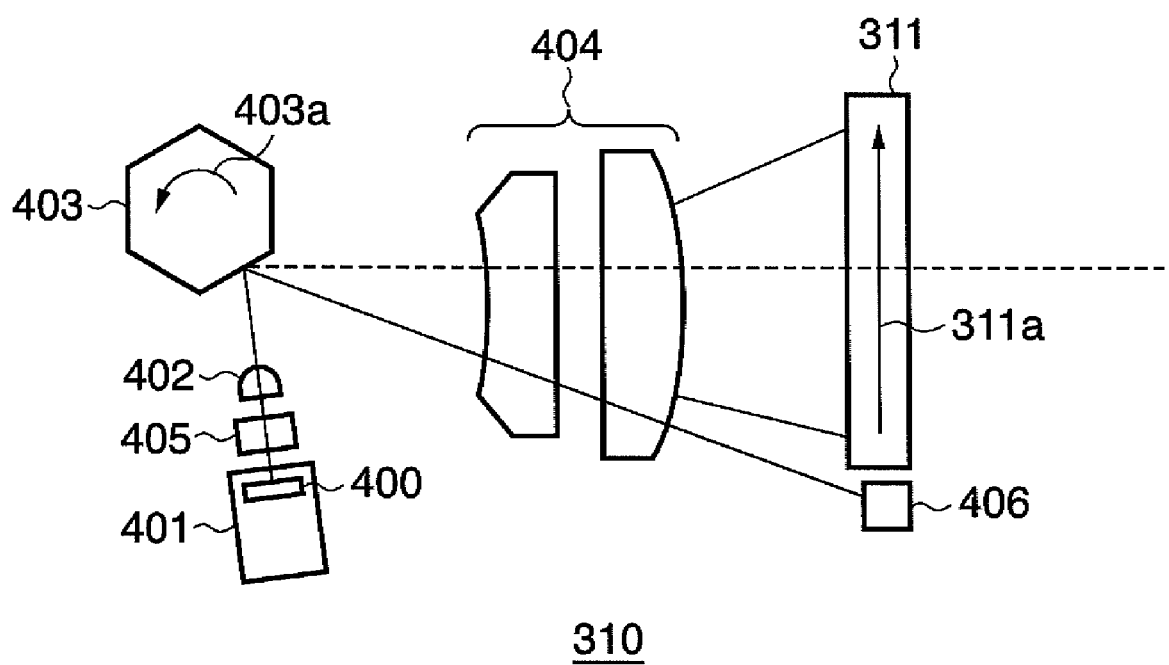
310

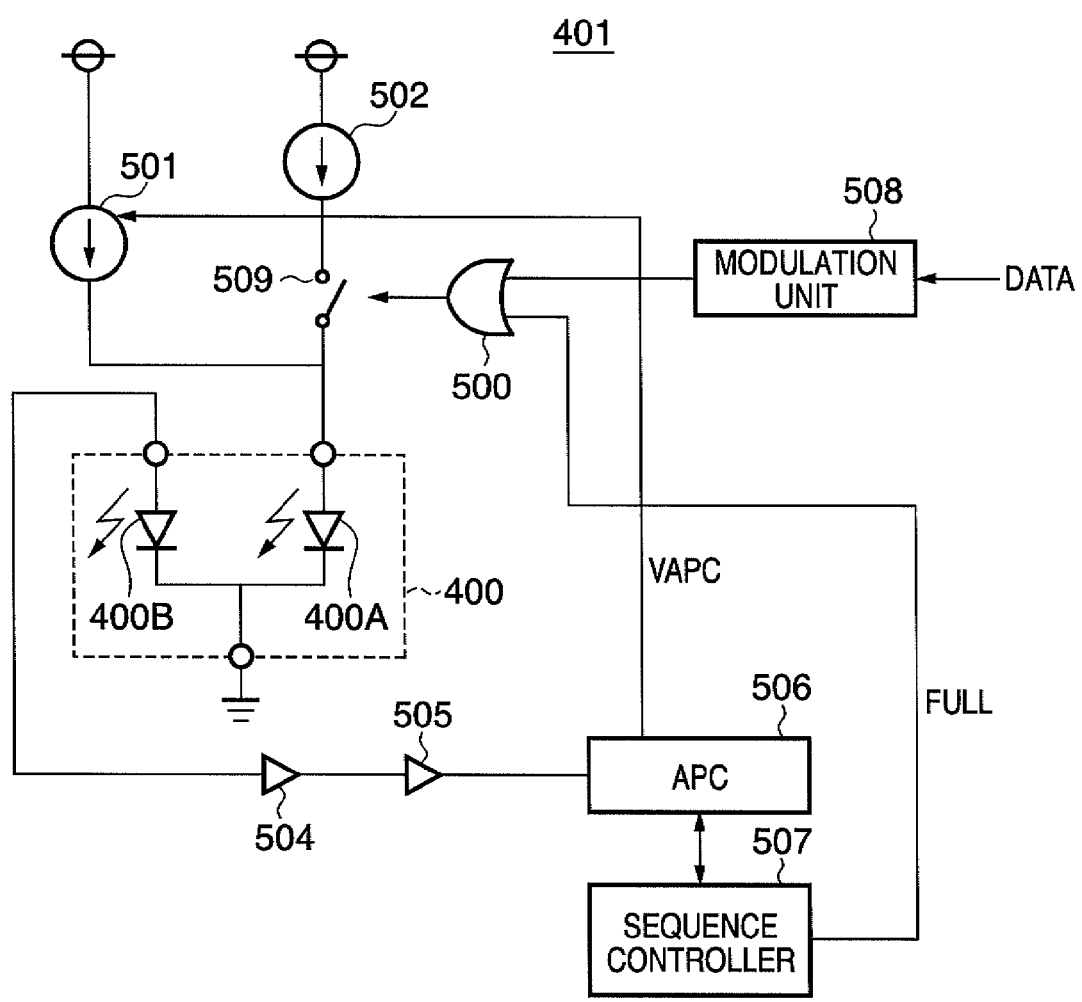
FIG. 3

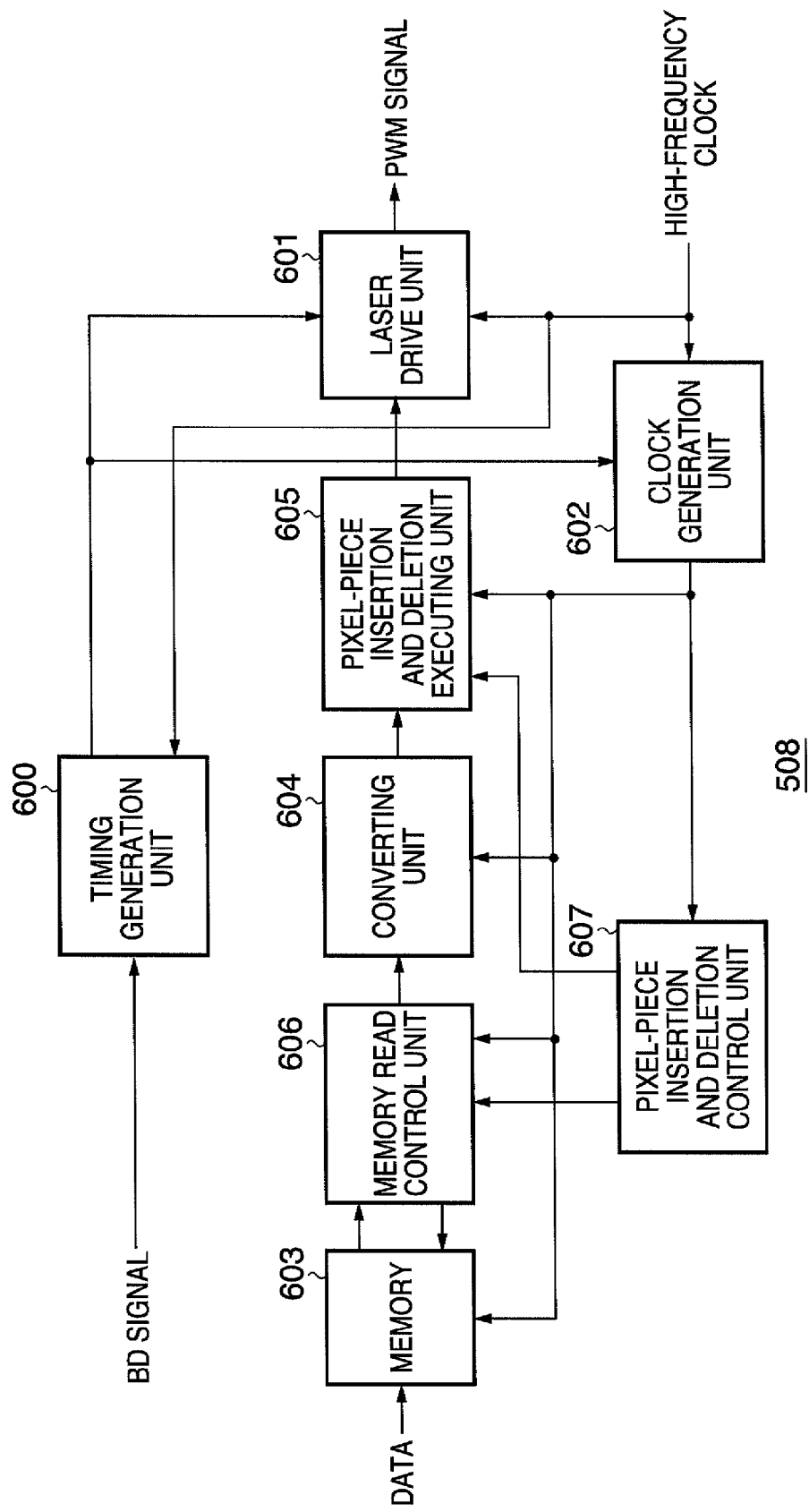

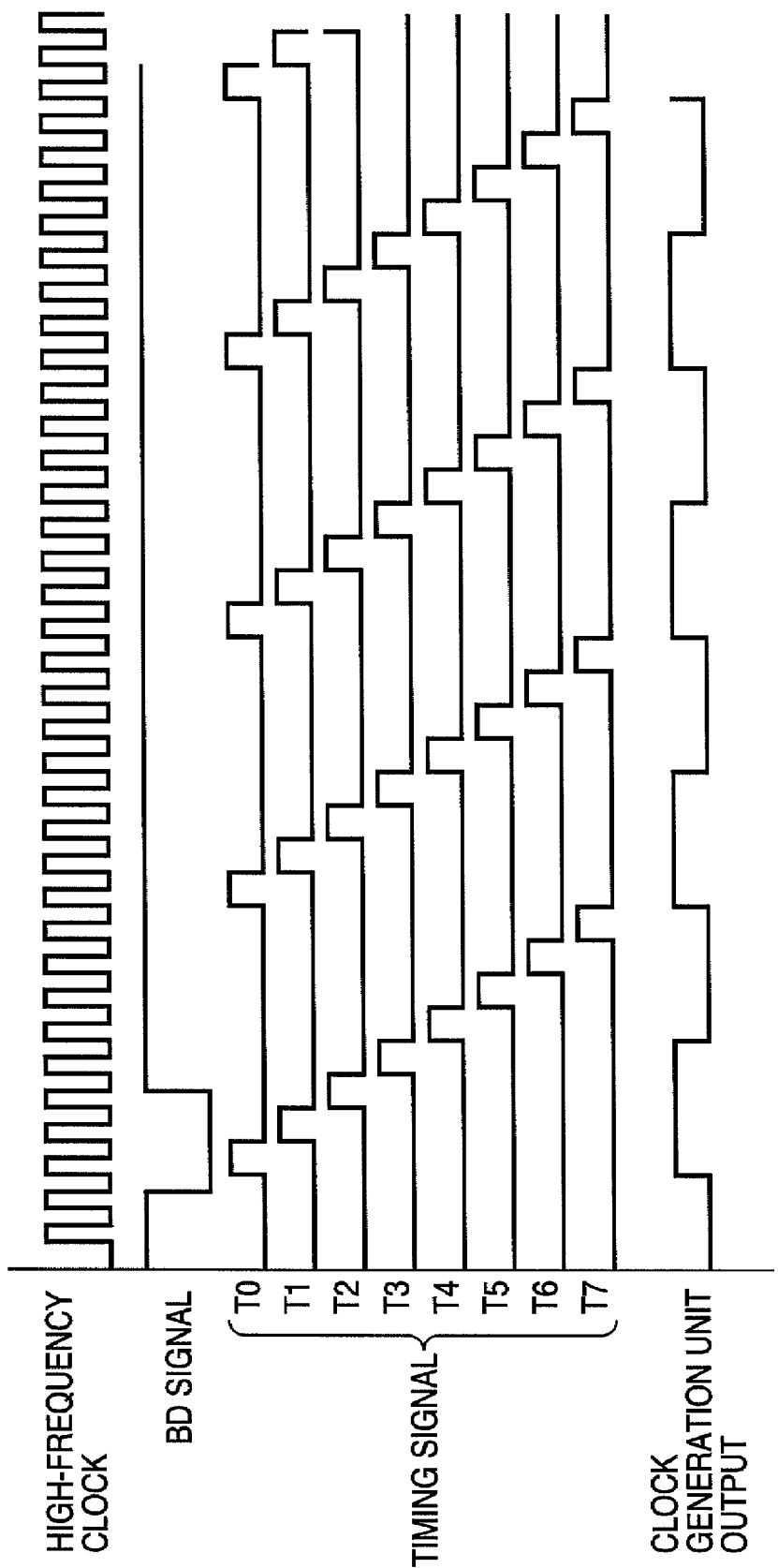
FIG. 5

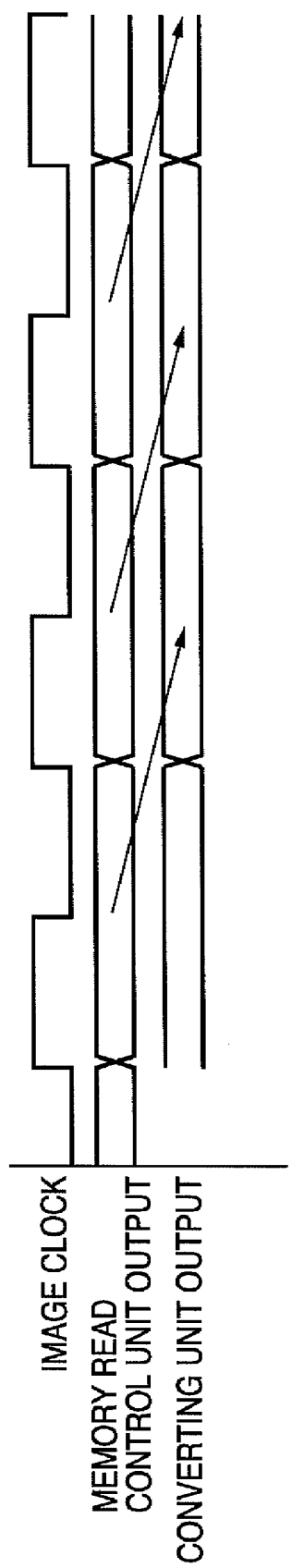

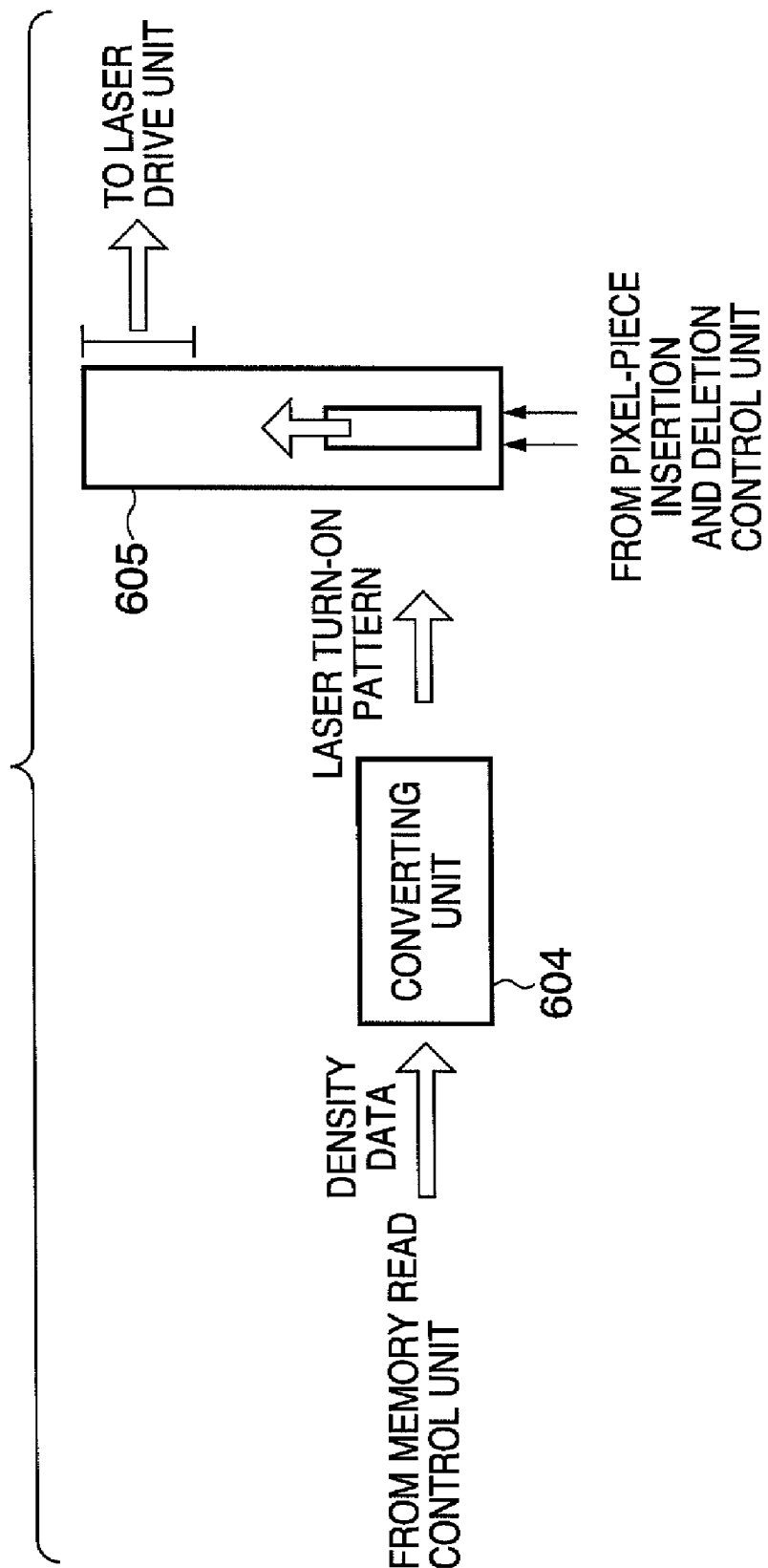

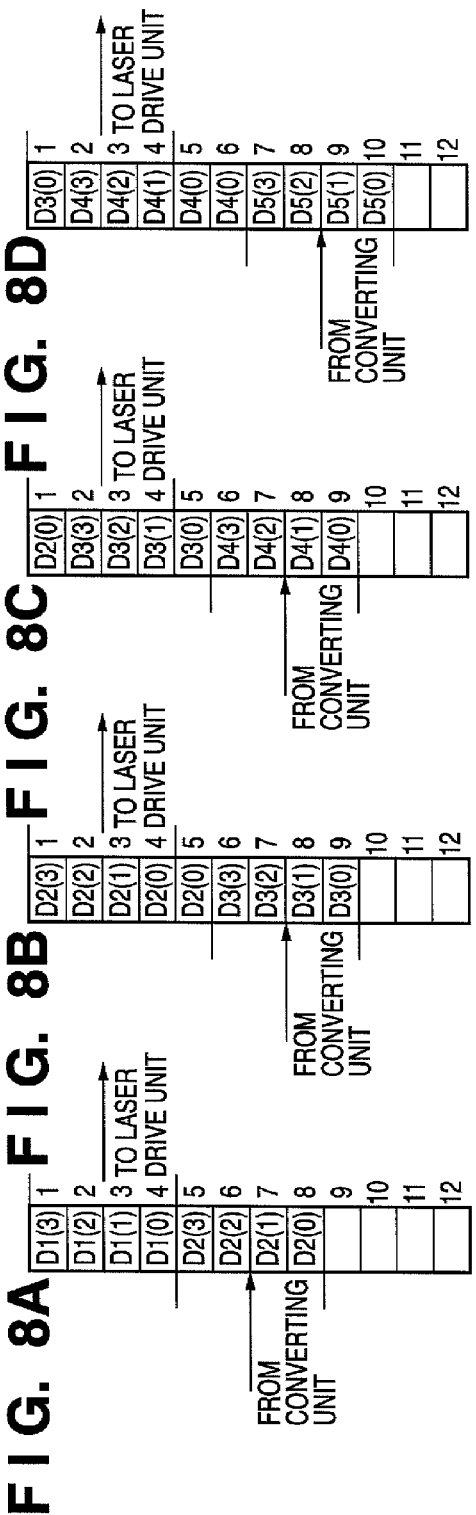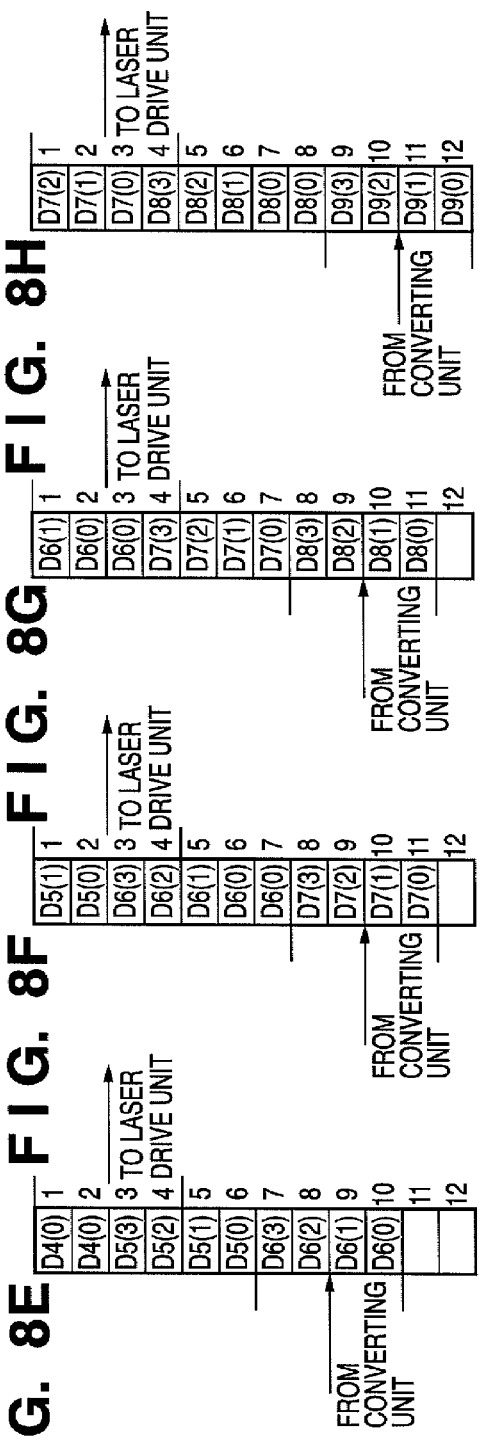

FIG. 9
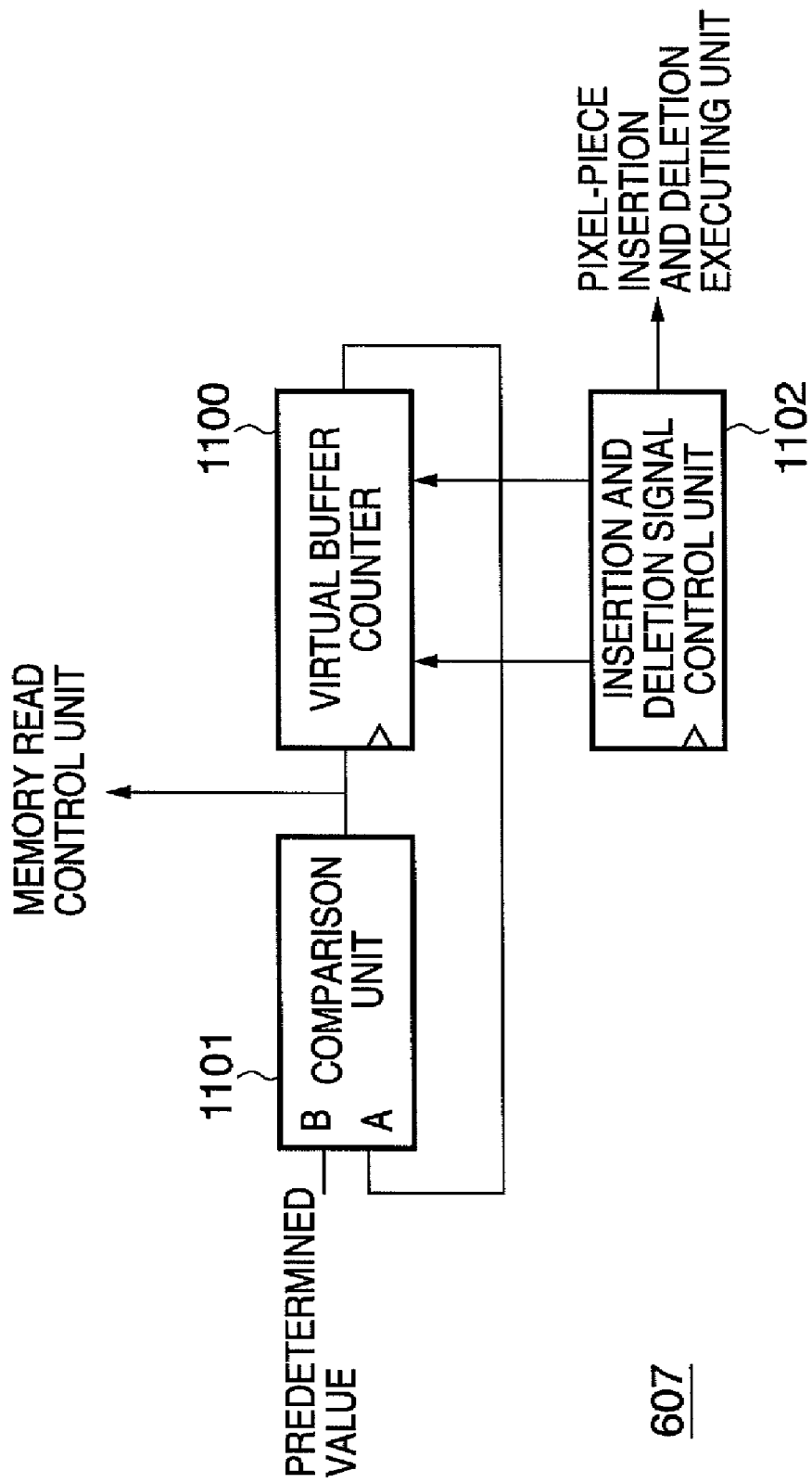

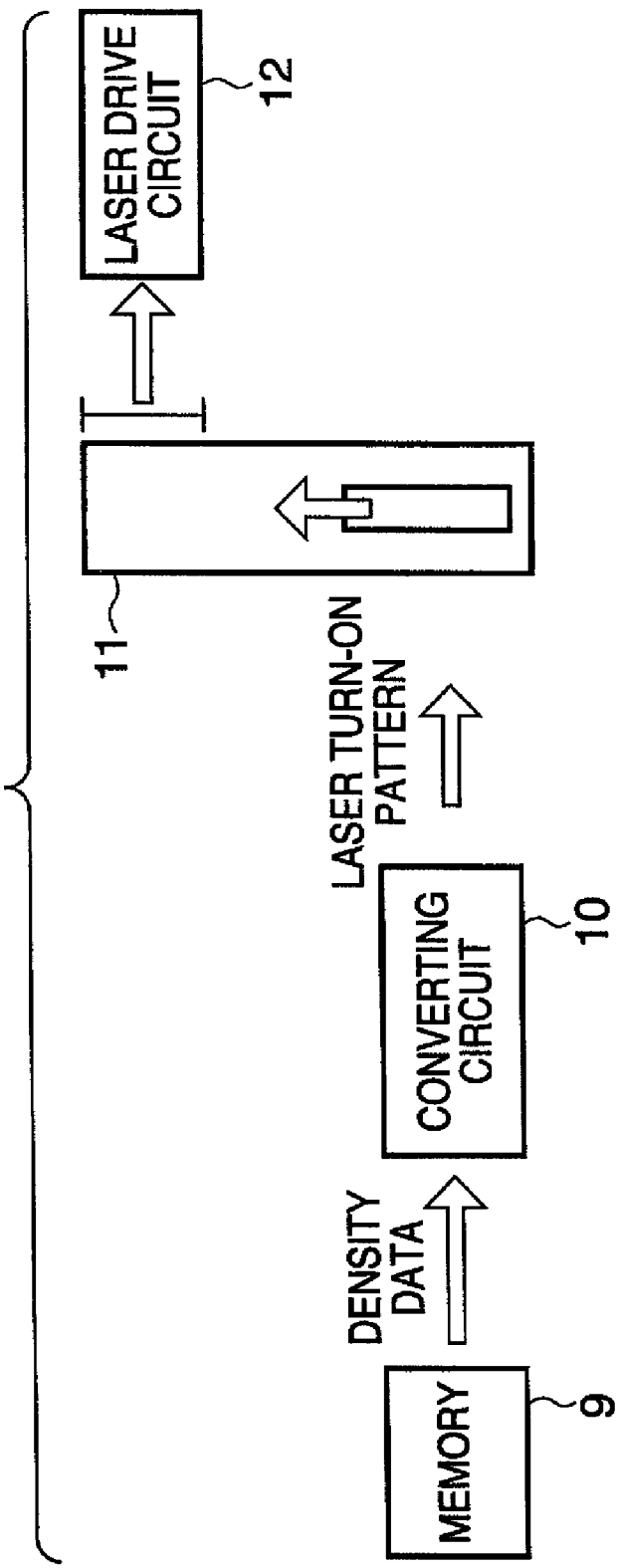
FIG. 10 PRIOR ART

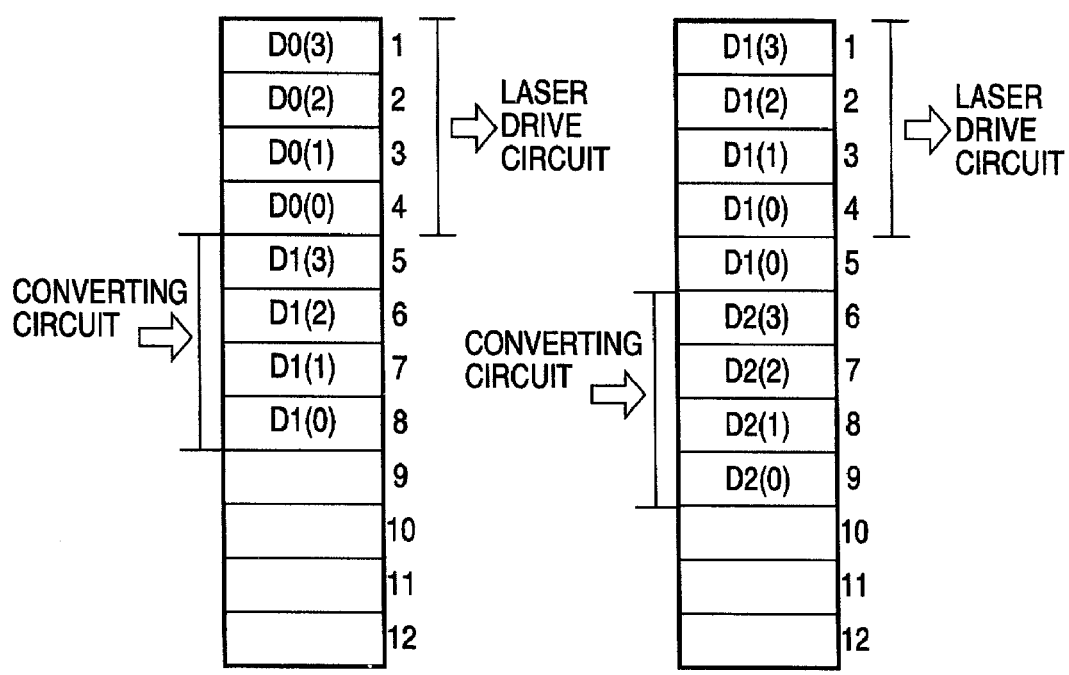
PRIOR ART
FIG. 11A
PRIOR ART
FIG. 11B

OPTICAL SCANNING APPARATUS AND OPTICAL SCANNING METHOD

BACKGROUND OF THE INVENTION

1. Field of the Invention

The present invention relates to an optical scanning apparatus and optical scanning method and, more particularly, to an optical scanning apparatus for forming an electrostatic latent image on an image carrier by controlling the output from a light source and an optical scanning method applied to the optical scanning apparatus.

2. Description of the Related Art

A conventional electrophotographic image forming apparatus for executing image exposure using a laser beam irradiates a rotary polyhedral mirror (polygonal mirror) with a laser beam and scans and exposes a photosensitive member using the reflected light. At this time, the laser light source is preferably equidistant from the exposure surface of the photosensitive member independently of the rotational position of the polygonal mirror. That is, the exposure surface of the photosensitive member preferably forms a circular arc about the polygonal mirror. In fact, many image forming apparatuses employ a cylindrical photosensitive member from the viewpoint of image formation after exposure, and the linear portion of the cylinder corresponds to the main scanning direction of the laser beam. To solve the problem of nonuniformity of the optical path length from the laser light source to the surface of the photosensitive member caused by the cylindrical photosensitive member, conventionally, an optical unit called an f-θ lens with a complex structure is used to unify the exposure speed on the photosensitive member.

Along with the recent increase in image forming speed, an image forming apparatus which executes exposure using a plurality of laser light sources arranged in the sub-scanning direction is used. Even in this image forming apparatus using the plurality of laser light sources, it is necessary to equalize the main-scanning optical path lengths from the light source to the photosensitive member surface and also equalize the optical path lengths (scan lengths) between the photosensitive member and the plurality of lasers arranged in the sub-scanning direction. To meet these requirements, conventionally, the accuracies of the optical and mechanical structures are raised.

For example, the f-θ lens for an image forming apparatus is manufactured at a high accuracy. This inevitably increases the cost of the f-θ lens and makes it difficult to cope with cost reduction that is recently required of an image forming apparatus.

Additionally, as the resolution of the image forming apparatus increases, the conventionally allowed difference in scan length between the photosensitive member and the plurality of lasers influences the output image. That is, the scan length difference has become nonnegligible.

Furthermore, in an image forming apparatus having a plurality of photosensitive members, the structure for adjusting the scanning magnification (scan length) on each photosensitive member becomes complex or requires adjustment, resulting in an increase in cost.

To solve these problems, conventionally, an image forming apparatus as disclosed in, for example, Japanese Patent Laid-Open No. 2005-96351 has been proposed. In this image forming apparatus, an effective image area is divided into a plurality of areas along the longitudinal direction of the photosensitive member, and image data (piece of pixel) is inserted into or removed from each of the divided areas, thereby controlling the main-scanning partial magnification in each of the divided areas. This maintains the main-scanning magnification on the photosensitive member constant and prevents degradation in image quality.

However, the conventional image forming apparatus disclosed in Japanese Patent Laid-Open No. 2005-96351 has the following problems.

The problems of the conventional image forming apparatus disclosed in Japanese Patent Laid-Open No. 2005-96351 will be described here with reference to FIGS. 10, 11A, and 11B.

FIG. 10 is a block diagram showing the arrangement of a portion which executes image data (piece of pixel) insertion and removal in the conventional image forming apparatus disclosed in Japanese Patent Laid-Open No. 2005-96351.

In this image forming apparatus, a converting circuit 10 converts a density signal (density data) output from a memory 9 into a PWM turn-on pattern (laser turn-on pattern) and inputs it to a shift register 11. The shift register 11 has a storing capacity capable of storing turn-on patterns of at least two pixels (the shift register 11 shown in FIGS. 11A and 11B can store turn-on patterns of three pixels, as will be described later). The shift register 11 shifts image data of one pixel in synchronism with a clock signal output from a clock generation circuit (not shown). The shift register 11 outputs, to a laser drive circuit 12, the earliest one of the stored image data as a PWM turn-on pattern (laser turn-on pattern). The shift register 11 inserts or removes image data (piece of pixel) by using a predetermined shift method. This will be described with reference to FIGS. 11A and 11B. PWM is short for "pulse width modulation".

FIGS. 11A and 11B are views showing the storage contents of the shift register 11. FIG. 11A shows the storage contents of the shift register 11 without insertion of image data (piece of pixel). FIG. 11B shows the storage contents of the shift register 11 with insertion of 1-bit image data (piece of pixel).

In this case, for example, one pixel is expressed by 4-bit image data. The shift register 11 has a storing capacity of 12 bits and can therefore store image data of three pixels. Each block shown in FIGS. 11A and 11B indicates a 1-bit storage area in the shift register 11. A number added to the right side of each block indicates an internal address.

The converting circuit 10 generates four image data bits of each pixel based on the density signal (density data) output from the memory 9 and supplies the image data to the shift register 11. Without insertion of image data (piece of pixel) (FIG. 11A), four image data bits D0(3) to D0(0) of the first pixel are inserted into areas of addresses 1 to 4, respectively. The image data bit D0(3) indicates the most significant bit of the first pixel. The image data bit D0(0) indicates the least significant bit of the first pixel. Next, four image data bits D1(3) to D1(0) of the second pixel are inserted into areas of addresses 5 to 8, respectively.

On the other hand, the four image data bits D0(3) to D0(0) of the first pixel are output to the laser drive circuit 12 in synchronism with the clock signal. The four image data bits D1(3) to D1(0) of the second pixel are shifted to the areas of address 1 to 4.

To insert image data (piece of pixel) next to the image data bits D1(3) to D1(0) of the second pixel, as shown in FIG. 11B, the image data bit D1(0) identical to the image data bit D1(0) stored in the area of address 4 is stored in the area of address 5. Then, four image data bits D2(3) to D2(0) of the third pixel are inserted into areas of addresses 6 to 9, respectively.

After that, the four image data bits D1(3) to D1(0) of the second pixel are output to the laser drive circuit 12 in synchronism with the clock signal. The image stored in the areas of addresses 5 to 9 are shifted to the areas of address 1 to 5.

In image data (piece of pixel) removal, 1-bit image data is removed (deleted) from the shift register 11.

In this way, the main-scanning partial magnification on the photosensitive member is maintained constant, and the degradation in image quality is prevented.

However, when such insertion of 1-bit image data (piece of pixel) is repeated, the capacity of the shift register 11 may become too small to store new image data received from the converting circuit 10. If the shift register 11 does not have a sufficient capacity, the converting circuit 10 must stop density data read-out from the memory 9 until a predetermined capacity is ensured. Additionally, when removal of 1-bit image data (piece of pixel) is repeated, image data to be supplied from the shift register 11 to the laser drive circuit 12 may run out. In this case, the converting circuit 10 must read out not image data of one pixel but image data of two pixels from the memory 9 simultaneously and supply PWM turn-on patterns (laser turn-on patterns) of two pixels to the shift register 11.

To stop density data read-out from the memory 9 or simultaneously read out density data of two pixels, a monitoring part that monitors the storing state in the shift register 11 is necessary. A monitoring result (shortage in capacity or lack of stored image data) obtained by the monitoring part is fed back to a reading control unit (not shown) which controls data read-out from the memory 9, thereby stopping density data read-out or simultaneously reading out density data of two pixels.

If a delay time exists in the signal transmission path from the monitoring part to the reading control unit, the monitoring part needs to predict an amount of change of the monitoring result during the delay time and notify the reading control unit of it. Hence, the structure of the monitoring part becomes complex.

If the monitoring part is designed and manufactured, and then, a new module (e.g., control unit for another image processing) is added between the monitoring part and the reading control unit by changing the specifications, the delay time also changes, and the monitoring part requires redesign.

SUMMARY OF THE INVENTION

The present invention has been made in consideration of the above-described problems, and has as its feature to provide an optical scanning apparatus and optical scanning method which allow stop of density data read-out from a memory to a shift register or simultaneous read-out of density data of two pixels independently of a delay time in a signal transmission path from a monitoring part to a reading control unit.

In order to achieve the above feature, according to the invention of claim 1, there is provided an optical scanning apparatus for forming an electrostatic latent image on an image carrier by controlling an output from a light source, comprising a clock generation unit which generates a clock signal corresponding to digital data of one pixel, an image data holding unit which holds input image data, an image read-out unit which reads out image data of at least one pixel from the image data holding unit in synchronism with the clock signal generated by the clock generation unit, a converting unit which converts a density of each pixel into digital data of a plurality of bits based on the image data of at least one pixel read out by the image read-out unit, a shift register which stores at least two pixels of the digital data obtained by the converting unit and shifts the digital data every pixel in synchronism with the clock signal generated by the clock generation unit, a data inserting and deleting unit which inserts data of one bit into the shift register or deletes data of one bit from the shift register, a drive unit which receives the digital data of one pixel output from the shift register and drives the light source based on the digital data, an estimating unit which estimates a data storing state in the shift register, and a reading control unit which controls read-out of the image data from the image data holding unit by the image read-out unit in accordance with the data storing state estimated by the estimating unit.

According to an embodiment of the invention, there is provided an optical scanning method applied to an optical scanning apparatus including a clock generation unit which generates a clock signal corresponding to digital data of one pixel, an image data holding unit which holds input image data, a shift register which stores at least two pixels of digital data of a plurality of bits each representing a density of a pixel, which are converted based on the image data of at least one pixel, and shifts the digital data every pixel in synchronism with the clock signal generated by the clock generation unit, and a drive unit which receives the digital data of one pixel output from the shift register and drives a light source based on the digital data, the method comprising the steps of reading out image data of at least one pixel from the image data holding unit in synchronism with the clock signal generated by the clock generation unit, converting a density of each pixel into digital data of a plurality of bits based on the image data of at least one pixel read out in the image read-out step, inserting data of one bit into the shift register or deleting data of one bit from the shift register, estimating a data storing state in the shift register, and controlling read-out of the image data from the image data holding unit in the image read-out step in accordance with the data storing state estimated in the estimating step.

Further features of the present invention will become apparent from the following description of exemplary embodiments (with reference to the attached drawings).

BRIEF DESCRIPTION OF THE DRAWINGS

FIG. 1 is a sectional view showing the arrangement of an image forming apparatus according to an embodiment of the present invention;

FIG. 2 is a view showing the arrangement of an exposure unit shown in FIG. 1;

FIG. 3 is a circuit diagram showing the internal arrangement of a laser drive device shown in FIG. 2;

FIG. 4 is a block diagram showing the internal arrangement of a modulation unit shown in FIG. 3;

FIG. 5 is a timing chart showing signal forms in the respective units of the modulation unit shown in FIG. 4;

FIG. 6 is a timing chart showing the signal forms of input and output signals in a converting unit shown in FIG. 4;

FIG. 7 is a block diagram showing the operations of the converting unit and a pixel-piece insertion and deletion executing unit;

FIGS. 8A to 8H are views showing the storage contents of a shift register in the pixel-piece insertion and deletion executing unit;

FIG. 9 is a block diagram showing the internal arrangement of a pixel-piece insertion and deletion control unit;

FIG. 10 is a block diagram showing the arrangement of a portion which executes image data (piece of pixel) insertion and removal in a conventional image forming apparatus disclosed in Japanese Patent Laid-Open No. 2005-96351; and FIGS. 11A and 11B are views showing the storage contents of a shift register.

DESCRIPTION OF THE EMBODIMENTS

The best mode for carrying out the invention will be described below with reference to the accompanying drawings.

FIG. 1 is a sectional view showing the arrangement of an image forming apparatus according to an embodiment of the present invention. The image forming apparatus can be implemented as, for example, a printing apparatus, printer, copying machine, multi-function peripheral, or facsimile apparatus.

Referring to FIG. 1, document sheets stacked on a document feeder 301 are sequentially conveyed onto a glass document table 302 one by one. When a document is conveyed, a lamp 303 in a scanner unit 304 turns on and irradiates the document, and the scanner unit 304 moves in the sub-scanning direction. Light reflected from the document passes through a lens 308 via mirrors 305, 306, and 307. The light is input to an image sensor unit 309 and converted into an image signal. The image signal obtained by the image sensor unit 309 is temporarily stored in an image memory (not shown), read out again, and input to an exposure unit 310.

The exposure unit 310 generates a laser beam corresponding to the received image signal and irradiates a photosensitive member 311 with the laser beam. An electrostatic latent image is formed on the photosensitive member 311 and developed by a developer 313 so that a toner image is formed on the photosensitive member 311. The photosensitive member 311 is an example of an image carrier. The exposure unit 310 is an example of an optical scanning apparatus.

In synchronism with the generation timing of the latent image or toner image, a transfer medium is conveyed from a transfer medium stacking unit 314 or 315. A transfer unit 316 transfers the toner image on the photosensitive member 311 to the transfer medium. The toner image transferred to the transfer medium is fixed on the transfer medium by a fixing unit 317. Then, a discharge unit 318 discharges the transfer medium from the apparatus. Note that the transfer medium is sometimes called a printing member, printing medium, paper, sheet, or transfer sheet.

A cleaner 325 cleans the surface of the photosensitive member 311 after transfer. Then, an auxiliary charger 326 executes discharge to obtain a satisfactorily charged state. A pre-exposure lamp 327 removes residual charges on the photosensitive member 311. A primary charger 328 charges the surface of the photosensitive member 311.

When these steps are repeated, images are formed on a plurality of transfer mediums.

FIG. 2 is a view showing the arrangement of the exposure unit 310 shown in FIG. 1.

Referring to FIG. 2, reference numeral 401 denotes a laser drive device; and 400, a semiconductor laser chip (to be described later in detail with reference to FIG. 3). The semiconductor laser chip 400 incorporates a laser diode that emits a laser beam, and a PD (photodiode) sensor that detects part of the generated laser beam. The laser diode executes APC (Auto Power Control) to keep the intensity of the generated laser beam constant by using a detection signal from the PD sensor.

A collimator lens 405 and a stop 402 convert the laser beam generated from the semiconductor laser chip 400 into an almost parallel light beam having a predetermined beam diameter and input the light to a polygonal mirror 403. The polygonal mirror 403 rotates in the direction of an arrow 403a at a uniform angular velocity. In accordance with the rotation, the polygonal mirror 403 reflects the received laser beam and outputs a deflected light beam which continuously changes the angle. An f-θ lens 404 condenses the light converted into the deflected light beam. The f-θ lens 404 simultaneously corrects distortion to guarantee the temporal linearity of scanning. Hence, the deflected light beam is scanned at a uniform velocity on the photosensitive member 311 in the direction of an arrow 311a. Note that the f-θ lens 404 used here can be an inexpensive general-purpose lens with a relatively low accuracy.

A beam detection sensor (to be referred to as a "BD sensor" hereinafter) 406 detects light reflected from the polygonal mirror 403. A detection signal (BD signal) from the BD sensor 406 is used as a sync signal to synchronize the rotation of the polygonal mirror 403 with latent image formation on the photosensitive member 311 in the main scanning direction.

The above-described image forming apparatus has a single laser drive device 401 and a single photosensitive member 311. The present invention is also applicable to an image forming apparatus having a plurality of laser drive devices or a plurality of photosensitive members.

FIG. 3 is a circuit diagram showing the internal arrangement of the laser drive device 401 shown in FIG. 2.

The laser drive device 401 is formed from the semiconductor laser chip 400 including a laser diode 400A and a PD sensor 400B. The laser drive device 401 also has a bias current source 501 and a pulse current source 502. A detection signal from the PD sensor 400B is fed back to the bias current source 501, thereby executing APC of the amount of bias current flowing to the laser diode 400A. This improves the light-emitting characteristic of the laser diode 400A. The laser diode 400A is an example of a light source.

More specifically, when a sequence controller 507 outputs a full turn-on signal FULL to an OR logic element 500, the OR logic element 500 outputs an ON signal to a switch 509. With this operation, the sum of the currents from the bias current source 501 and pulse current source 502 flows to the laser diode 400A. The PD sensor 400B detects the laser beam output from the laser diode 400A. The detection signal is input to a current-voltage converter 504 and converted into a voltage signal. The voltage signal is amplified by an amplifier 505 and input to an APC circuit 506. The APC circuit 506 generates a control signal VAPC based on the amplified voltage signal and outputs the generated signal to the bias current source 501 so that the laser beam output from the laser diode 400A always has a predetermined intensity.

Generally, the laser diode has a temperature characteristic. Hence, the amount of current necessary for obtaining a predetermined amount of light increases as the temperature rises. Additionally, the laser diode generates heat by itself. For this reason, it is impossible to obtain a predetermined amount of light by only supplying a predetermined current. To do this, the laser drive device 401 executes the above-described APC in every scanning in the main scanning direction and controls the current amount to be flowed to the laser diode 400A such that the light-emitting characteristic in every scanning becomes constant.

A current thus controlled by APC is supplied to the switch 509. The switch 509 is turned on/off by a PWM signal that is modulated based on image data DATA and output from a modulation unit 508. While the image data DATA is being input to the modulation unit 508, no full turn-on signal FULL is output from the sequence controller 507 to the OR logic element 500.

Hence, the laser beam generated from the laser diode 400A is turned on/off in accordance with image data. The laser beam irradiates and scans the surface of the photosensitive member 311, thereby forming a latent image on the photosensitive member 311.

FIG. 4 is a block diagram showing the internal arrangement of the modulation unit 508 shown in FIG. 3.

Referring to FIG. 4, a timing generation unit 600 receives a BD signal output from the BD sensor 406 and generates a timing signal according to the BD signal. A laser drive unit 601 and a clock generation unit 602 operate in synchronism with the timing signal output from the timing generation unit 600. The clock generation unit 602 is an example of a clock generation unit which generates a clock signal corresponding to digital data of one pixel.

The laser drive unit 601 generates a PWM signal to drive the laser diode 400A based on the output signal from a pixel-piece insertion and deletion executing unit 605. The clock generation unit 602 outputs a clock to a memory 603, memory read control unit 606, converting unit 604, pixel-piece insertion and deletion executing unit 605, and pixel-piece insertion and deletion control unit 607. The timing generation unit 600, laser drive unit 601, and clock generation unit 602 operate based on a high-frequency clock.

The memory 603 receives and stores the image data DATA (density data) sent from the image sensor unit 309 (FIG. 1). The memory 603 is an example of an image data holding unit which holds received image data. The memory read control unit 606 which operates in synchronism with the clock from the clock generation unit 602 receives an image request signal from the pixel-piece insertion and deletion control unit 607 and reads out image data of at least one pixel from the memory 603. The memory read control unit 606 normally reads out image data of one pixel and, if the amount of data (PWM turn-on pattern signals) stored in the pixel-piece insertion and deletion executing unit 605 becomes smaller than the data amount of one pixel, reads out image data of two pixels, as will be described later. If the capacity of the pixel-piece insertion and deletion executing unit 605 becomes smaller than the data amount of one pixel, the memory read control unit 606 stops read-out of image data. The memory read control unit 606 is an example of an image read-out unit which reads out image data of at least one pixel from the image data holding unit in synchronism with the clock signal generated by the clock generation unit.

The converting unit 604 converts, for each pixel, the image data of at least one pixel that the memory read control unit 606 reads out from the memory 603 into a PWM turn-on pattern signal as the base of the PWM signal to be output from the laser drive unit 601. The converting unit 604 is an example of a converting unit which converts the density of each pixel into digital data of a plurality of bits based on image data of at least one pixel read out by the image read-out unit. The laser drive unit 601 is an example of a drive unit which receives digital data of one pixel output from the shift register and drives the light source based on the digital data.

The pixel-piece insertion and deletion executing unit 605 includes a shift register. A PWM turn-on pattern signal of at least one pixel output from the converting unit 604 is sequentially written, for each pixel, in the shift register. The PWM turn-on pattern signals are shifted every pixel in synchronism with the clock from the clock generation unit 602. The pixel-piece insertion and deletion executing unit 605 receives an insertion signal or deletion signal from the pixel-piece insertion and deletion control unit 607. Based on the received insertion signal or deletion signal, the pixel-piece insertion and deletion executing unit 605 executes a shift operation to insert or delete a piece of pixel (data corresponding to the minimum unit (1 bit) of the storing capacity of the shift register). This shift operation will be described later in detail. The shift register included in the pixel-piece insertion and deletion executing unit 605 is an example of a shift unit which stores data of at least two pixels of the digital data obtained by the converting unit and shifts the digital data every pixel in synchronism with the clock signal generated by the clock generation unit. The pixel-piece insertion and deletion executing unit 605 is an example of a data inserting and deleting unit which inserts 1-bit data into the shift register or deletes 1-bit data from the shift register. The pixel-piece insertion and deletion control unit 607 is an example of an estimating unit which estimates a data storing state in the shift register and a reading control unit which controls image data read-out by the image read-out unit from the image data holding unit in accordance with the data storing state estimated by the estimating unit.

FIG. 5 is a timing chart showing signal forms in the respective units of the modulation unit 508 shown in FIG. 4. FIG. 5 particularly shows the forms of the input and output signals of the timing generation unit 600, laser drive unit 601, and clock generation unit 602.

The period of the high-frequency clock shown in FIG. 5 is ⅛ the generation period of image data of one pixel. That is, image data of one pixel is divided into eight parts. The frequency of the high-frequency clock determines the resolution of an image output from the image forming apparatus.

The timing generation unit 600 detects the trailing edge of the BD signal (FIG. 5) and, based on this detection, generates timing signals T0 to T7 (FIG. 5) each having a period of eight times the high-frequency clock. First, the timing signal T0 changes to high level during the first period of the high-frequency clock and then changes to low level during the second to eighth periods of the high-frequency clock. Next, the timing signal T1 changes to high level during the second period of the high-frequency clock and then changes to low level during the third to ninth periods of the high-frequency clock. The timing signals T2 to T7 are generated sequentially in the same way. At the input timing of the BD signal, the timing signals T0 to T7 are generated. The above-described sequence is repeated until the next BD signal input.

The laser drive unit 601 generates a PWM signal in accordance with the timing signals T0 to T7 and the PWM turn-on patterns output from the pixel-piece insertion and deletion executing unit 605.

The clock generation unit 602 outputs a clock (to be referred to as an "image clock" hereinafter) corresponding to the generation period of image data of one pixel in accordance with the timing signals T0 to T7. More specifically, the clock generation unit 602 generates an image clock (FIG. 5) which rises at the leading edge of the timing signal T0 and falls at the leading edge of the timing signal T4.

FIG. 6 is a timing chart showing the signal forms of input and output signals in the converting unit 604 shown in FIG. 4.

In synchronism with the image clock (FIG. 6), the converting unit 604 converts 3-bit image data (memory read control unit output in FIG. 6) that the memory read control unit 606 reads out from the memory 603 into an 8-bit PWM turn-on pattern signal (converting unit output in FIG. 6) and outputs it to the pixel-piece insertion and deletion executing unit 605.

The converting unit 604 incorporates a transformation table based on one of the end growth, central growth, and logarithmic transformation methods. The converting unit 604 converts received 3-bit density data into 8-bit PWM patterns and outputs them by using the transformation table. The transformation table may be set by any other method. The transformation table may be provided in a part other than the converting unit 604.

FIG. 7 is a block diagram showing the operations of the converting unit 604 and pixel-piece insertion and deletion executing unit 605.

The memory read control unit 606 reads out 3-bit image data (density data) from the memory 603, and the converting unit 604 converts the image data into an 8-bit PWM turn-on pattern signal and inputs it to the pixel-piece insertion and deletion executing unit 605. The pixel-piece insertion and deletion executing unit 605 includes a shift register having a storing capacity capable of storing PWM turn-on pattern signals of at least two pixels. The pixel-piece insertion and deletion executing unit 605 shifts the data every pixel in synchronism with the clock signal output from the clock generation unit 602. The pixel-piece insertion and deletion executing unit 605 outputs the earliest 8-bit PWM turn-on patterns to the laser drive unit 601.

FIGS. 8A to 8H are views showing the storage contents of the shift register in the pixel-piece insertion and deletion executing unit 605. That is, FIGS. 8A to 8H show PWM turn-on pattern signal input to the shift register and data shift in it.

For the descriptive convenience, assume that one pixel is expressed by a 4-bit PWM turn-on pattern signal, and the shift register has a storing capacity of 12 bits and can therefore store PWM turn-on pattern signals of three pixels, unlike the above embodiment. Each block shown in FIGS. 8A to 8H indicates a 1-bit storage area in the shift register. A number added to the right side of each block indicates the address of the storage area.

First, the pixel-piece insertion and deletion control unit 607 transmits an image request signal to the memory read control unit 606. The memory read control unit 606 reads out the density signal (density data) of each pixel from the memory 603 and transmits the signal to the converting unit 604. Based on the received density signal (density data), the converting unit 604 generates a 4-bit PWM turn-on pattern signal (laser turn-on pattern) for each pixel and supplies it to the pixel-piece insertion and deletion executing unit 605.

As shown in FIG. 8A, without insertion of a piece of pixel (data corresponding to one bit of the shift register), four PWM turn-on pattern signal bits D1(3) to D1(0) of the first pixel are inserted into areas of addresses 1 to 4 of the shift register, respectively. The image data bit D1(3) indicates the most significant bit of the PWM turn-on pattern signal of the first pixel. The image data bit D1(0) indicates the least significant bit. Next, four PWM turn-on pattern signal bits D2(3) to D2(0) of the second pixel are inserted into areas of addresses 5 to 8, respectively.

The data (PWM turn-on pattern signal bits D1(3) to D1(0)) in the areas of addresses 1 to 4 of the shift register are output to the laser drive unit 601 in synchronism with the image clock generated by the clock generation unit 602. The data (PWM turn-on pattern signal bits D2(3) to D2(0)) in the areas of addresses 5 to 8 of the shift register are shifted to the areas of address 1 to 4 of the shift register.

Next, when the pixel-piece insertion and deletion control unit 607 inputs an insertion signal to the pixel-piece insertion and deletion executing unit 605, a piece of pixel is inserted, as shown in FIG. 8B. More specifically, data identical to the data (PWM turn-on pattern signal bit D2(0)) in the area of address 4 is stored in the area of address 5 of the shift register. Then, four PWM turn-on pattern signal bits D3(3) to D3(0) of the third pixel are inserted into areas of addresses 6 to 9 of the shift register, respectively.

After that, the data (PWM turn-on pattern signal bits D2(3) to D2(0)) in the areas of addresses 1 to 4 of the shift register are output to the laser drive unit 601 in synchronism with the image clock. The data (PWM turn-on pattern signal bits D2(0) and D3(3) to D3(0)) in the areas of addresses 5 to 9 of the shift register are shifted to the areas of address 1 to 5 of the shift register.

Next, as shown in FIG. 8C, without insertion of a piece of pixel, four PWM turn-on pattern signal bits D4(3) to D4(0) of the fourth pixel are inserted into areas of addresses 6 to 9 of the shift register, respectively.

The data (PWM turn-on pattern signal bits D2(0) and D3(3) to D3(1)) in the areas of addresses 1 to 4 of the shift register are output to the laser drive unit 601 in synchronism with the image clock. The data (PWM turn-on pattern signal bits D3(0) and D4(3) to D4(0)) in the areas of addresses 5 to 9 of the shift register are shifted to the areas of address 1 to 5 of the shift register.

Next, when the pixel-piece insertion and deletion control unit 607 inputs an insertion signal to the pixel-piece insertion and deletion executing unit 605, a new piece of pixel is inserted, as shown in FIG. 8D. More specifically, data identical to the data (PWM turn-on pattern signal bit D4(0)) in the area of address 5 is stored in the area of address 6 of the shift register. Then, four PWM turn-on pattern signal bits D5(3) to D5(0) of the fifth pixel are inserted into areas of addresses 7 to 10 of the shift register, respectively.

After that, the data (PWM turn-on pattern signal bits D3(0) and D4(3) to D1(1)) in the areas of addresses 1 to 4 of the shift register are output to the laser drive unit 601 in synchronism with the image clock. The data (PWM turn-on pattern signal bits D4(0), D4(0), and D5(3) to D5(0)) in the areas of addresses 5 to 10 of the shift register are shifted to the areas of address 1 to 6 of the shift register.

Next, as shown in FIG. 8E, without insertion of a piece of pixel, four PWM turn-on pattern signal bits 06(3) to D6(0) of the sixth pixel are inserted into areas of addresses 7 to 10 of the shift register, respectively.

The data (PWM turn-on pattern signal bits D4(0), D4(0), D5(3), and D5(2)) in the areas of addresses 1 to 4 of the shift register are output to the laser drive unit 601 in synchronism with the image clock. The data (PWM turn-on pattern signal bits D5(1), D5(0), and D6(3) to D6(0)) in the areas of addresses 5 to 10 of the shift register are shifted to the areas of address 1 to 6 of the shift register.

Next, when the pixel-piece insertion and deletion control unit 607 inputs an insertion signal to the pixel-piece insertion and deletion executing unit 605, a new piece of pixel is inserted, as shown in FIG. 8F. More specifically, data identical to the data (PWM turn-on pattern signal bit D6(0)) in the area of address 6 is stored in the area of address 7 of the shift register. Then, four PWM turn-on pattern signal bits D7(3) to D7(0) of the seventh pixel are inserted into areas of addresses 8 to 11 to the shift register, respectively.

After that, the data (PWM turn-on pattern signal bits D5(1), D5(0), D6(3), and D6(2)) in the areas of addresses 1 to 4 of the shift register are output to the laser drive unit 601 in synchronism with the image clock. The data (PWM turn-on pattern signal bits D6(1), D6(0), D6(0), and D7(3) to D7(0)) in the areas of addresses 5 to 11 of the shift register are shifted to the areas of address 1 to 7 of the shift register.

Next, as shown in FIG. 8G, without insertion of a piece of pixel, four PWM turn-on pattern signal bits D8(3) to D8(0) of the eighth pixel are inserted into areas of addresses 8 to 11 of the shift register, respectively.

The data (PWM turn-on pattern signal bits D6(1), D6(0), D6(0), and D7(3)) in the areas of addresses 1 to 4 of the shift register are output to the laser drive unit 601 in synchronism with the image clock. The data (PWM turn-on pattern signal bits D7(2) to D7(0), and D8(3) to D8(0)) in the areas of addresses 5 to 11 of the shift register are shifted to the areas of address 1 to 7 of the shift register.

Next, when the pixel-piece insertion and deletion control unit 607 inputs an insertion signal to the pixel-piece insertion and deletion executing unit 605, a new piece of pixel is inserted, as shown in FIG. 8H. More specifically, data identical to the data (PWM turn-on pattern signal bit D8(0)) in the area of address 7 is stored in the area of address 8 of the shift register. Then, four PWM turn-on pattern signal bits D9(3) to D9(0) of the ninth pixel are inserted into areas of addresses 9 to 12 of the shift register, respectively.

After that, the data (PWM turn-on pattern signal bits D7(2) to D7(0) and D8(3)) in the areas of addresses 1 to 4 of the shift register are output to the laser drive unit 601 in synchronism with the image clock. The data (PWM turn-on pattern signal bits D8(2) to D8(0), D8(0), and D9(3) to D9(0)) in the areas of addresses 5 to 12 of the shift register are shifted to the areas of address 1 to 8 of the shift register.

When the pixel-piece insertion and deletion control unit 607 inputs an insertion signal to the pixel-piece insertion and deletion executing unit 605, data identical to the data (PWM turn-on pattern signal bit D9(0)) in the area of address 8 is stored in the area of address 9 of the shift register, although not illustrated. Since the shift register has only three free areas of addresses 10 to 12, it is impossible to store four PWM turn-on pattern signal bits D10(3) to D10(0) of the 10th pixel in the shift register.

In this case, the pixel-piece insertion and deletion control unit 607 stops transmitting an image request signal to the memory read control unit 606 so that the memory read control unit 606 stops density signal read-out from the memory 603.

FIG. 9 is a block diagram showing the internal arrangement of the pixel-piece insertion and deletion control unit 607.

The pixel-piece insertion and deletion control unit 607 is assumed to have a virtual buffer which virtually indicates the same states as the use states (occupied state or unoccupied state) of the 12 storage areas of the shift register in the pixel-piece insertion and deletion executing unit 605. A virtual buffer counter 1100 counts the number of occupied areas with data or the number of unoccupied areas without data in the virtual buffer. An insertion and deletion signal control unit 1102 outputs an insertion start signal or deletion start signal to the virtual buffer counter 1100 in inserting or deleting a piece of pixel. Upon receiving the insertion start signal or deletion start signal from the insertion and deletion signal control unit 1102, the virtual buffer counter 1100 counts the number of unoccupied areas without data or the number of occupied areas with data in the virtual buffer. The virtual buffer counter 1100 is an example of a detection unit which detects the state of use of each storage area of the virtual buffer. A comparison unit 1101 compares the count value of the virtual buffer counter 1100 with a predetermined value. In inserting a piece of pixel, the predetermined value equals the minimum number of unoccupied areas of the shift register necessary for causing the shift register in the pixel-piece insertion and deletion executing unit 605 to store a new PWM turn-on pattern signal. In deleting a piece of pixel, the predetermined value equals the minimum number of PWM turn-on pattern signal bits that must be stored in the shift register to enable supply of a PWM turn-on pattern signal from the pixel-piece insertion and deletion executing unit 605 to the laser drive unit 601.

For example, in inserting a piece of pixel, the virtual buffer counter 1100 receives an insertion start signal from the insertion and deletion signal control unit 1102 and counts the number of unoccupied areas without data in the virtual buffer. The comparison unit 1101 compares the count value (the number of unoccupied areas) of the virtual buffer counter 1100 with a predetermined value (4 in the example shown in FIGS. 8A to 8H). If the count value is smaller than the predetermined value, the comparison unit 1101 stops transmitting an image request signal to the memory read control unit 606 so that the memory read control unit 606 stops density signal read-out from the memory 603. On the other hand, if the count value is equal to or larger than the predetermined value, the comparison unit 1101 continues transmitting an image request signal to the memory read control unit 606 so that the memory read control unit 606 continues density signal read-out from the memory 603.

In deleting a piece of pixel, the virtual buffer counter 1100 receives a deletion start signal from the insertion and deletion signal control unit 1102 and counts the number of occupied areas with data in the virtual buffer. The comparison unit 1101 compares the count value (the number of occupied areas with data) of the virtual buffer counter 1100 with a predetermined value (4 in the example shown in FIGS. 8A to 8H). If the count value is equal to or smaller than the predetermined value, the comparison unit 1101 transmits an image request signal for reading out density signals of two pixels to the memory read control unit 606 so that the memory read control unit 606 simultaneously reads out density signals of two pixels from the memory 603. On the other hand, if the count value is larger than the predetermined value, the comparison unit 1101 continues transmitting an image request signal to the memory read control unit 606 so that the memory read control unit 606 continues density signal read-out from the memory 603.

As described above, according to this embodiment, it is unnecessary to feed back information representing the data storing state in the shift register from the pixel-piece insertion and deletion executing unit 605 incorporating the shift register to the memory read control unit 606. This obviates the conventional monitoring part and consequently solves the problem caused by the delay time in the signal transmission path from the monitoring part to the reading control unit. Hence, the structure of the laser drive device 401 can be simplified.

If the monitoring part is designed and manufactured, and then, a new module is added between the monitoring part and the reading control unit by changing the specifications, as in the prior art, the delay time also changes, and the monitoring part requires redesign. In this embodiment, however, since the conventional monitoring part is unnecessary, the problem of the prior art does not occur.

In this embodiment, the pixel-piece insertion and deletion executing unit 605 inserts a piece of pixel into a PWM turn-on pattern or deletes a piece of pixel from a PWM turn-on pattern. This unifies the scanning speed on the photosensitive member 311 in the main scanning direction. Even in an image forming apparatus having a plurality of laser drive devices or a plurality of photosensitive members, it is possible to equalize the optical path lengths (scan lengths) between the plurality of lasers and the plurality of photosensitive members arranged in the sub-scanning direction.

Other Embodiments

In the above embodiment, the modulation unit 508 may be formed as an information processing apparatus having a CPU, RAM, ROM, and the like.

The feature of the present invention is achieved by executing the following processing. That is, a storage medium which records software program codes for implementing the functions of the above-described embodiment is supplied to a system or apparatus, and the computer (or CPU or MPU) of the system or apparatus reads out the program codes from the storage medium.

In this case, the program codes read out from the storage medium implement the functions of the above-described embodiment by themselves, and the program codes and the storage medium which stores the program codes constitute the present invention.

Examples of the storage medium usable to supply the program codes are a Floppy® disk, hard disk, magnetooptical disk, CD-ROM, CD-R, CD-RW, DVD-ROM, DVD-RAM, DVD-RW, DVD+RW, magnetic tape, nonvolatile memory card, and ROM. The program codes may be downloaded via a network.

The present invention also incorporates a case wherein the functions of the above-described embodiment are implemented by causing a computer to execute the readout program codes. The functions of the above-described embodiment are also implemented when the OS (Operating System) running on the computer partially or wholly executes actual processing based on the instructions of the program codes.

The present invention also incorporates a case wherein the functions of the above-described embodiment are implemented by the following processing. That is, the program codes read out from the storage medium are written in the memory of a function expansion board inserted into the computer or a function expansion unit connected to the computer. The CPU of the function expansion board or function expansion unit partially or wholly executes actual processing based on the instructions of the program codes.

According to the present invention, image data of one pixel is read out from the image data holding unit in synchronism with the clock signal corresponding to digital data of one pixel. Based on the readout image data of one pixel, the density of the corresponding pixel is converted into digital data of a plurality of bits. At least two pixels of the digital data are stored. In synchronism with the clock signal, 1-bit data is inserted into the shift register that shifts the digital data every pixel, or 1-bit data is deleted from the shift register. The data storing state in the shift register is estimated, and image data read out from the image data holding unit is controlled in accordance with the estimated data storing state.

This allows stop of image data read-out from the image data holding unit to the shift register or simultaneous read-out of image data of two pixels independently of the delay time in the signal transmission path from the conventional monitoring part to the reading control unit. It is therefore possible to simplify the structure of the laser drive device of the image forming apparatus. In addition, since the conventional monitoring part is unnecessary, the problem of the prior art associated with the delay time in the signal transmission path does not occur.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-336947, filed on Dec. 14, 2006, which is hereby incorporated by reference herein in its entirety.

What is claimed is:

1. An optical scanning apparatus for forming an electrostatic latent image on an image carrier by scanning a light output from a light source on the image carrier, comprising:
   a clock generation unit which generates a clock signal;
   an image data holding unit which holds image data of at least one pixel;
   an image read-out unit which reads out the image data of at least one pixel from said image data holding unit in synchronism with the clock signal;
   a converting unit which converts a density of each pixel into digital data of a plurality of bits on a basis of the image data of at least one pixel read out by said image read-out unit;
   a shift unit having a plurality of storage areas each storing a bit of the digital data converted by said converting unit, and plurality of storage areas collectively storing digital data corresponding to at least two pixels, wherein the shift unit reads out the digital data corresponding to one pixel from the storage areas in synchronism with the clock signal and in sequence of a storing order of the digital data, wherein the shift unit shifts succeeding digital data into the storage area from which the digital data corresponding to the one pixel has been read out in response to reading out the digital data corresponding to the one pixel, and wherein the succeeding digital data succeeds the digital data corresponding to the one pixel in the storing order of the digital data;
   a data inserting and deleting unit which inserts data of at least one bit into one or more of the storage areas of said shift unit or deletes data of at least one bit from one or more of the storage areas of said shift unit according to a scanning position of the light output from the light source, wherein said data inserting and deleting unit comprises:
      a virtual buffer which virtually indicates a use state equal to a use state of each of the storage areas of said shift unit, and
      a detection unit which detects the use state of each of a plurality of virtual storage areas of said virtual buffer, wherein the virtual storage areas respectively correspond to the storage areas of said shift unit;
   a drive unit which receives the digital data of a pixel output from said shift unit and drives the light source on the basis of the received digital data; and
   a reading control unit which controls an amount of image data read-out from said image data holding unit by said image read-out unit in accordance with a detection result of the detection unit,
   wherein the virtual buffer is not connected to said shift unit and, consequently, does not indicate the use state of each of the storage areas of said shift unit based upon information received from the shift unit.

2. The apparatus according to claim 1, wherein said detection unit detects a number of the virtual storage areas of said virtual buffer in an unoccupied state, or a number of the virtual storage areas of said virtual buffer in an occupied state.

3. The apparatus according to claim 1, wherein said detection unit detects a number of the virtual storage areas of said virtual buffer that represent stored digital data, wherein said reading control unit determines a number of the storage areas in said shift unit which do not store any digital data based on detection results of the detection unit, and wherein the reading control unit controls said image data read-out unit not to read-out the image data from said image data holding unit if it is determined that the number of storage areas in said shift unit which do not store any digital data is equal to or less than a predetermined number.

4. The apparatus according to claim 1, wherein said detection unit detects a number of the virtual storage areas of said virtual buffer that represent stored digital data, and wherein said reading control unit controls said image data read-out unit to read-out the image data corresponding to at least two pixels from said image data holding unit if the number of the virtual storage areas that represent stored digital data is equal to or greater than a predetermined number.

* * * * *